Oct. 12, 1937.  E. A. JOHNSTON  2,095,876
HYDRAULIC POWER LIFT
Filed June 29, 1936  4 Sheets-Sheet 1
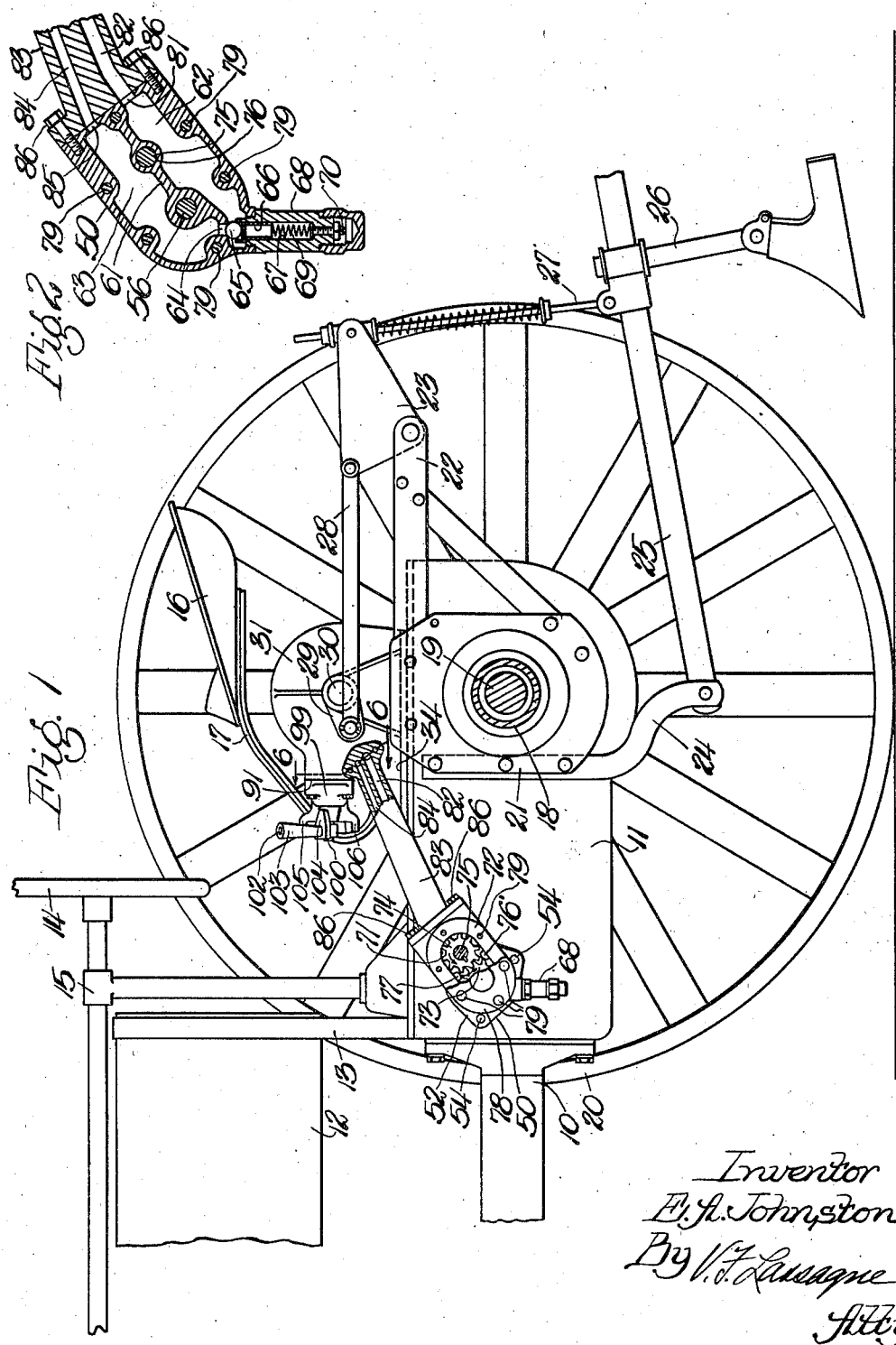

Oct. 12, 1937.    E. A. JOHNSTON    2,095,876
HYDRAULIC POWER LIFT
Filed June 29, 1936    4 Sheets-Sheet 2
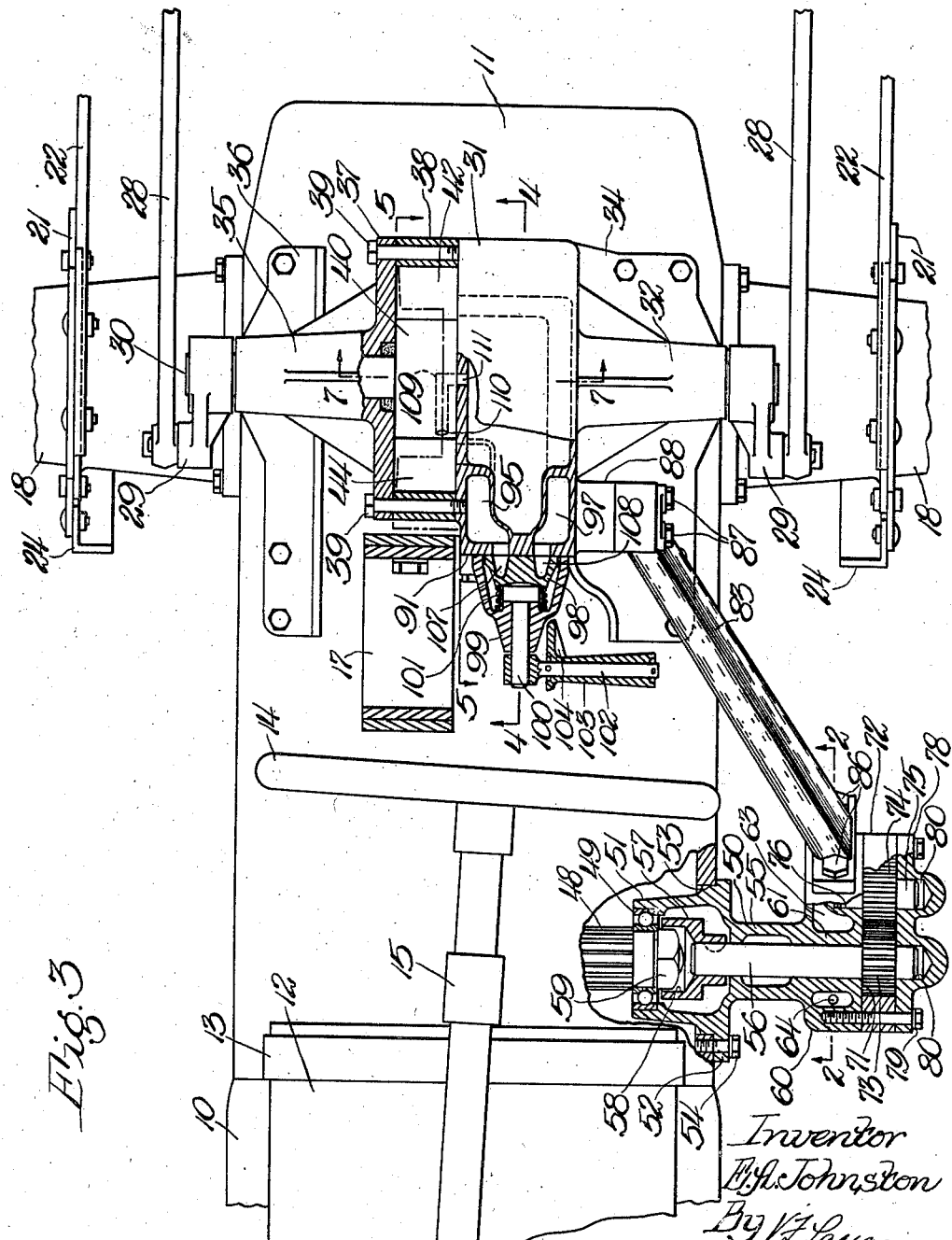

Oct. 12, 1937.   E. A. JOHNSTON   2,095,876
HYDRAULIC POWER LIFT
Filed June 29, 1936   4 Sheets-Sheet 3
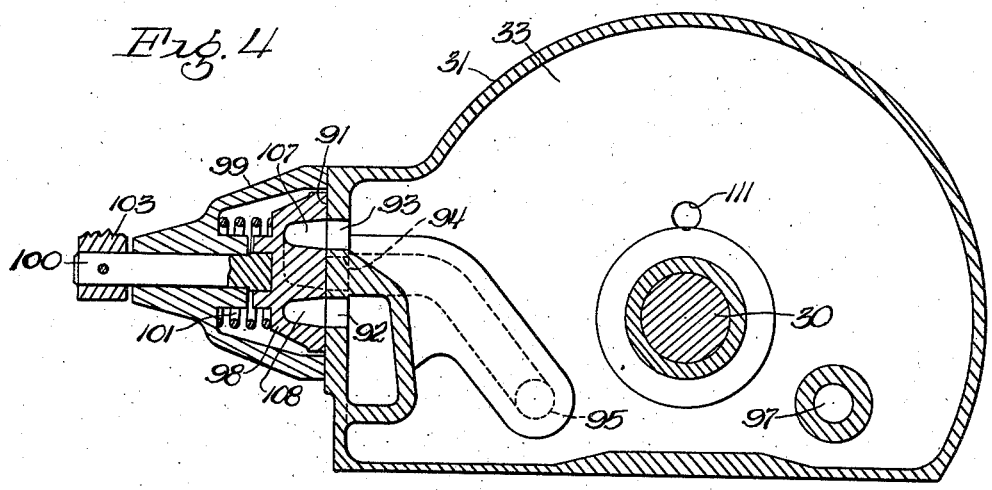
Fig. 4
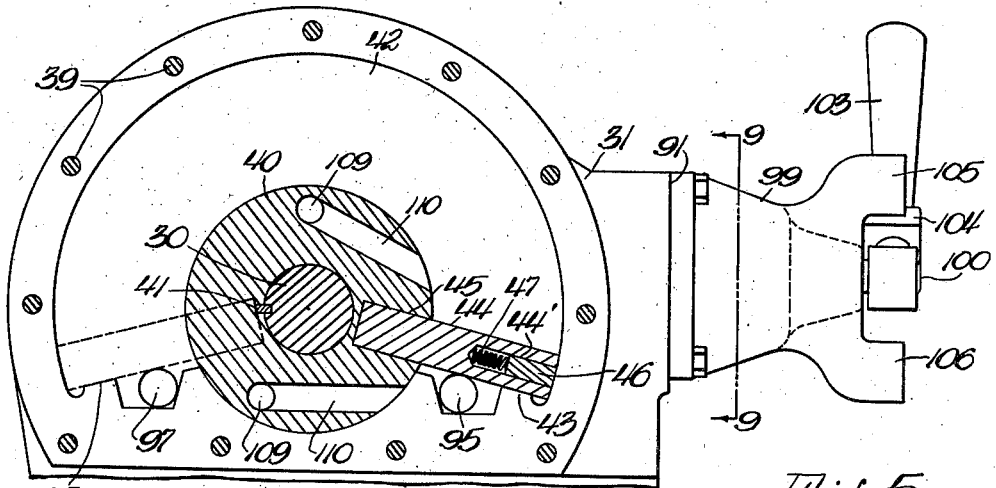
Fig. 5
Fig. 6
Inventor
E. A. Johnston
By V. F. Lavagne
Att'y.

Oct. 12, 1937.  E. A. JOHNSTON  2,095,876
HYDRAULIC POWER LIFT
Filed June 29, 1936  4 Sheets-Sheet 4
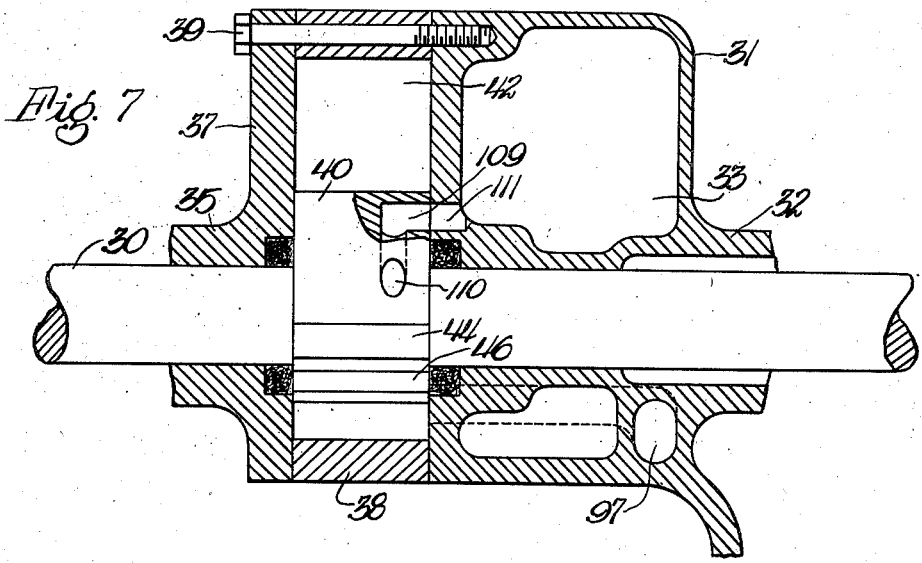
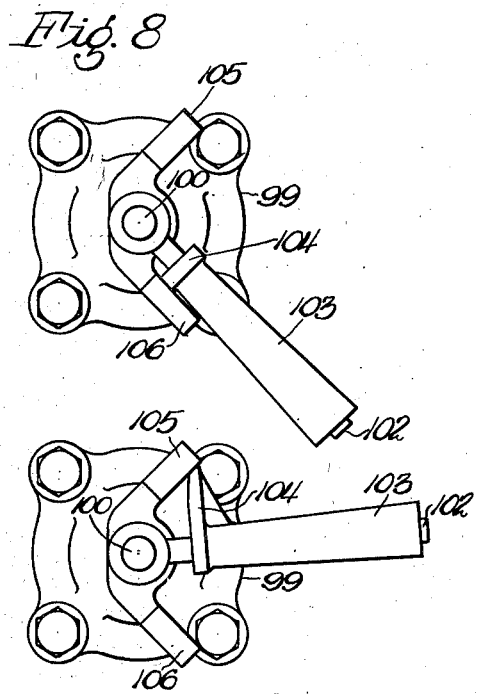
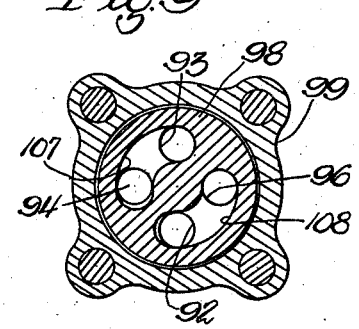
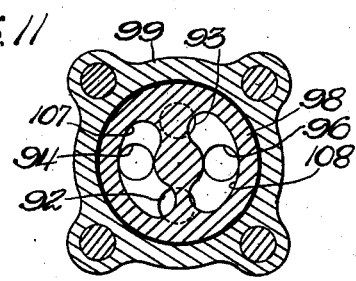
Inventor
E. A. Johnston
By V. T. Lasagne
Atty.

Patented Oct. 12, 1937

2,095,876

UNITED STATES PATENT OFFICE 2,095,876

HYDRAULIC POWER LIFT

Edward A. Johnston, Chicago, Ill., assignor to International Harvester Company, a corporation of New Jersey Application June 29, 1936, Serial No. 87,889

13 Claims. (Cl. 97—50)

This invention relates generally to power lift devices for tractors.

The principal object of the invention is to provide an improved power lift mechanism adapted to be mounted on a tractor as an auxiliary device or attachment and to be operated by power derived from the tractor engine for lifting, lowering, or otherwise adjusting implements, such as plows and cultivators attached to, or operated by the tractor.

More specifically, another object of the invention is to provide a hydraulically operated power lift embodying a control mechanism for regulating the rate of movement of the lifting elements.

Another object of the invention is to provide an improved pump mechanism and a hydraulic lift adapted to be driven directly by a transmission shaft forming an element of the tractor transmission. Other objects, such as the improved and simplified conduit structure leading from the pump to the power lift casing, will be apparent from the detailed description to follow. In the drawings:

Figure 1 is a side elevation of the rear portion of a tractor with one axle broken away to show a power lift mechanism embodying the invention incorporated as a part of the tractor. Portions of the pump casing and of the liquid conducting member are broken away to show the interior construction. An implement is illustrated to show an operative connection for the lift;

Figure 2 is a vertical section taken on the line 2—2 of Figure 3;

Figure 3 is a top plan view of the same structure shown in Figure 1 with both wheels broken away. In this figure the pump casing is broken away by a transverse horizontal section to show the pump gears and the drive connection with the tractor transmission shaft. The lift casing is also broken away by a horizontal section to show the interior thereof and to better show the valve mechanism;

Figure 4 is a vertical longitudinal section through the pump casing taken on the line 4—4 of Figure 3;

Figure 5 is a vertical longitudinal section taken on the line 5—5 of Figure 3;

Figure 6 is a transverse vertical section taken on the line 6—6 of Figure 1;

Figure 7 is a transverse vertical section taken on the line 7—7 of Figure 3;

Figure 8 is an enlarged front end elevation showing the valve control mechanism;

Figure 9 is a transverse vertical section taken on the line 9—9 of Figure 5 with the valve control mechanism in the position shown in Figure 8;

Figure 10 is an enlarged front end elevation showing the valve control mechanism in slow drop position; and, Figure 11 corresponds to Figure 9 with the valve in the position shown in Figure 10.

Only the rear portion of a tractor has been shown as a power lift device embodying the invention may be incorporated in or mounted on any of the conventional types of farm tractors having a narrow body portion and a forwardly located transmission. The tractor illustrated shows the rear portion of a frame 10 which is connected to a longitudinally extending transmission, differential and final drive housing 11. A portion of a gasoline tank 12 is shown carried by a support 13. A steering wheel 14 is illustrated as being carried by a support 15. An operator's seat 16 is carried by a support 17.

At the rear of the housing 11 axle housings 18 extend laterally to provide journals and axles 19 on which wheels 20 are mounted. Attaching plates 21 are shown secured to the axle housings 18. Supporting brackets 22 connected to said plates provide means for pivotally mounting lifting members 23. The plates 21 also provide means for attaching draft members 24 to which beams 25 are pivotally attached. An earth working tool 26 is shown mounted on one of the beams 25 in Figure 2. It is to be understood that a plurality of such tools or other tools may be mounted on attaching means pivotally connected to the tractor. A spring pressure link 27 is pivotally connected to a portion of the beam 25 and to the lifting element 23. A lifting link 28 is pivotally connected to the lifting element 23 and to the crank 29 of a transverse lifting shaft 30.

The shaft 30 is substantially in vertical alignment parallel and spaced above the axis of the tractor axles. Said shaft extends transversely through the power lift casing 31 which consists of three principal parts. As shown on the bottom side of Figure 3, one portion of the casing 31 includes an extended bearing support 32 for the shaft 30 and a liquid reservoir portion 33. Said reservoir is also provided with cored-in passages for the directed flow of liquid as will be hereinafter described. This part of the casing is also provided with a horizontal attaching flange 34 which is adapted to be secured by a plurality of cap screws to the upper side of the housing 11.

At the upper side of Figure 3 or on the right hand side looking in the direction of travel of the tractor, there is a part of the casing which consists essentially of a laterally extending bearing support 35, a horizontal attaching flange 36, and a vertical plate 37. Said plate is fitted in an oil tight manner to a central annular portion 38 of the casing. Said portion is also fitted in an oil tight manner against the face of the reservoir 31. The three component parts of the casing are secured together by a plurality of cap screws 39. It will be understood that by means of this construction, the capacity of the hydraulic chamber which is formed by these members can be readily altered by changing the axle width of the center portion 38.

Referring to Figure 5, a hub 40 is secured by a key 41 against rotation on the shaft 30. Said hub is of a width equal to the axle width of the vane chamber which will be designated by the reference character 42. Said chamber is annular in its upper portion, as shown by Figure 5, and extends substantially more than 180°. The lower portion is formed with stops 43 at each side against which the vane 44 abuts in its two extreme positions of movement.

The vane 44 is fitted in a radial slot 45 formed in the hub 40. Said vane is fitted at its ends for fluid tight movement along the radial faces of the plate 37, and the reservoir 33. To provide a peripheral contact which will reduce by-pass flow to a minimum, a radially extending slot 44' is formed in the outer end of the vane 44. A transverse bar 46 is slidably mounted in the slot 44' and is spring-pressed against the inner surface of the member 38 by springs 47. Said vane forms, in effect a two-way hydraulic piston which may be moved in either angular direction to correspondingly move the lifting shaft 30.

As shown in Figure 3 by the broken away portion of the cover for the housing 11, the tractor is provided with a transverse shaft 48 which is the main shaft of the tractor transmission and which rotates at all times when the clutch is engaged whether the tractor is running or stationary. The end of the shaft 48 is carried in a ball bearing assembly 49. Said assembly is carried normally in a support which is secured to the side wall of the housing 11. For the installation of the power lift attachment the regular support is removed and a special support 50 is substituted therefor. Said support is provided with an extension 51 within the housing 11 which carries the ball bearing assembly 49. The member 50 is provided with a flange 52 which abuts the outside of the housing 11 around an opening 53 through which the portion 51 extends. A plurality of cap screws 54 hold the member 50 securely in position against the housing.

The member 50 includes a lateral extension 55 which forms a journal for a pump driving shaft 56. Said shaft is keyed to a driving member 57. Said member is enlarged at the end and provided with a hexagonal opening 58 which engages a hexagon 59 threaded on the end of the shaft 48. This construction and arrangement of parts provides a simple positive drive for the pump shaft 56. Beyond the extension 55 the member 50 is provided with an enlarged portion 60, as best shown in Figure 2. Said portion is divided by a wall 61 to form an inlet chamber 62 and a high pressure outlet chamber 63. A by-pass opening 64 in the wall 61 is closed by a valve in the form of a ball 65. Said ball is resiliently seated to allow by-pass when excess pressure is developed in the chamber 63. The resilient seating means consists of a slidable member 66 mounted for reciprocation in a bore 67 formed in a casing 68 which is threaded into an opening formed in the wall of the chamber 62. A spring 69 engages the lower end of the member 66. An adjustable stop 70 for the spring 69 is threaded into the lower end of the casing 68 for regulating the compression of the spring and thereby the pressure at which the valve by-passes fluid from the chamber 63. The outer face of the member 50 over the surface of the enlarged portion 60 is faced to form the inner wall of a pump chamber 71. The peripheral wall of said chamber is formed by a member 72, the general shape of which is best shown in Figure 1. The member 72 is rounded at each end to form cylindrical ends for the pump chamber 71. At one end of the chamber the pump shaft 56 carries a pump gear 73. At the other end of the chamber a pump gear 74 is mounted on a short shaft 75 which extends into a bore 76 formed in the portion 60 of the member 50. The gears 73 and 74 engage each other to form a gear pump of the conventional type. Said gears rotate in the direction indicated by arrows in Figure 1. An inlet 76' communicates between the inlet chamber 62 and the low pressure side of the pump gears. An outlet 77 forms a communication between the high pressure side of the gears and the outlet chamber 63. These openings are formed in the outer walls of the respective chambers.

A cover 78 encloses the pump gears and forms the outer wall of the pump chamber 71. Said cover and the member 72 are secured in position by a plurality of cap screws 79. The cover 78 is provided with bores 80 which form bearings for the outer ends of the pump shafts 56 and 75.

The inlet chamber 62 is provided with an inlet opening 81 which registers with a conduit 82 formed in the conduit member 83. Said member is constructed as a casting for rigidity and durability. It is also formed with a second conduit 84 communicating with an outlet opening 85 from the high pressure chamber 63. The conduit member 83 is flanged at its end and provided with a flat surface which engages a corresponding flat surface formed on the portion 60 of the pump casing. Cap screws 86 secure the flanged conduit member securely in position in a fluid tight manner.

As best shown in Figures 1 and 3, the conduit member 83 extends rearwardly, upwardly, and inwardly toward the power lift casing at the rear of the tractor. At its rear end the member 83 is provided with an attaching face positioned in a vertical longitudinal plane. By means of cap screws 87 the said upper end is secured in contact with a corresponding face formed on a boss 88 extending from the reservoir portion 33 of the power lift casing. The boss 88 is formed with a transverse outlet conduit 89 communicating with the conduit 82 in the conduit member 83 and an inlet conduit 90 communicating with the high pressure conduit 84. Said conduits 89 and 90 are cored in the casting forming the reservoir portion of the power lift casing.

At its forward side the reservoir portion 33 of the power lift casing is formed with a surfaced valve face 91. Said face is formed at the lower side with an opening 92 with which the conduit 90 communicates. Said face is also formed with an upper opening 93 which communicates directly with the reservoir 33, as best shown in Figure 4.

The valve face 91 is formed with an opening 94 which communicates with a conduit passage 95 cored in the reservoir portion of the power lift casing. Said passage, as shown in Figures 3, 4, 5, and 7 extends rearwardly, downwardly, and laterally, terminating, as shown best in Figure 5, in the vane chamber 42. The outlet end of the passage is below the vane when it is in its extreme position against the stop 43.

The valve face 91 is also provided with an opening 96 which communicates with a conduit passage 97. As shown by dotted lines in Figure 3, this passage which is cored in the reservoir portion 33 of the power lift casing extends downwardly, rearwardly, and laterally, terminating in the vane chamber 42, as shown in Figures 4 and 5. The dotted position of the vane in Figure 5 shows the position of the passage outlet with respect to the vane when it is in extreme position against the stop 43.

A valve member 98 rotatably supported in a housing 99 is mounted over the valve face 91. The housing 99 is rigidly secured against the face 91. An operating shaft 100 extending on an axis perpendicular to the face 91 is provided with a head within the housing 99 which non-rotatably engages the valve member 98. A spring 101 mounted within the housing 99 engages the valve member for resiliently maintaining it in seating position against the face 91.

The shaft 100 is provided with an operating means consisting of an arm 102 rigidly secured thereto on which an operating handle 103 is rotatably mounted. These are provided for allowing rotation of the handle 103 while preventing axial movement relative to the arm 102. As best shown in Figures 8 and 10, the operating handle 103 is provided with a stop 104 which by rotation of the handle may be moved to the position shown in Figure 10 in which it engages a stop 105 formed integral with the housing 99. The stop 104 may also be moved to the reverse position to engage the stop 106. As shown in Figure 8, the handle 103 is in the angular position at which the stop 104 is not effective. The function of this operating mechanism will be further explained in connection with the valve mechanism.

The valve member 98 is provided with two arcuate shaped, diametrically positioned recesses 107 and 108. These recesses are of a circumferential length sufficient to bridge two of the openings formed in the valve face and form communication therebetween. It is to be understood, therefore, that communication may be established between the opening 92 to which fluid under pressure is delivered from a pump and either the opening 94 leading to one side of the vane or the opening 96 leading to the other side of the vane. Simultaneously communication is established between the opening 93 leading to the reservoir and the other side of the vane to allow the escape of fluid therefrom. By providing a valve operating mechanism, as described and as shown particularly in Figures 8 and 10, the valve member 98 may be rotated to an intermediate position, as shown in Figure 11. In this position the supply of fluid under pressure to the opening 94 and therefrom to one side of the vane is throttled. Simultaneously the escape of fluid from the other side of the vane is throttled. By this means a slower movement of the vane may be obtained in either direction. This is particularly important in the power lifting of implements to prevent the rapid drop of implements when they are being lowered. During this cycle of operation the weight of the implement acts to assist the action of the pump whereby without some restraining means a rapid drop would result. By means of a valve arrangement, as described, and by utilizing an operating mechanism, as disclosed and described, a slow drop movement may be obtained. The same mechanism may also be used for a slow lift if the occasion for such a movement arises. The valve positions have not been shown for the slow lift, but it is obvious from inspection of Figures 8 to 11, inclusive, that the action would be the same by reversing the position of the stop 104, as the openings 92, 93, 94, and 96 are spaced at 90° with respect to each other and as the recesses 107 and 108 are bi-laterally symmetrical.

The power lift as disclosed incorporates another feature which is disclosed and claimed in Patent No. 2,039,801, May 5, 1936. As shown in dotted lines in Figure 3, and in the section of Figure 5, the hub 40 is provided with by-pass conduits 109 parallel to the axis of the lifting shaft 30 and spaced therefrom adjacent the peripheral surface of the hub. The conduits 109 are connected by conduits 110 with the surface of the hub, said conduits terminating adjacent the vane 44. As best shown by the broken away section of Figure 7 the conduits 109 are so positioned, as to communicate with a by-pass opening 111 formed in the inner wall of the reservoir 31. When the vane reaches its extreme position, as shown in Figure 5, the conduit 109 automatically comes into registration with the by-pass opening 111, whereby liquid being supplied to the vane chamber 42 is by-passed without appreciable resistance to the low pressure side of the system. The load is thereby removed from the pump which, although it runs continuously, carries no load except when the vane is in movement. When the valve is shifted to supply fluid under pressure to the passage 95 the vane is moved into the position shown in dotted lines. Communication with the by-pass opening 111 is closed by the end of the hub 40 until the conduit 109 on the other side of the vane comes into registration therewith.

The operation of the power lift mechanism, as above described, has been explained in connection with the description. As shown, the lifting crank 29 which is rigidly mounted on the lifting shaft 30 is in an over center position when the implement is in lifted position. This is a construction to which a double acting vane lift of this type is particularly adapted. Very little pressure is required against the vane to maintain it in position with an over center lock. The presence of fluid in the vane chamber is sufficient to prevent dislocation of the over center lock by jarring or other means. When the implement is to be lowered, the crank 29 moves upwardly about an arc passing the dead center position. The entire weight of the implement is then effective to act in cooperation with the pump to rapidly rotate the lifting shaft. It is to overcome rapid movement of this type that the control mechanism was devised. By throttling the liquid being released from the low pressure side of the vane, sufficient pressure is established to cause a resistance effective to lower the implement gradually. At the same time the supply of fluid under pressure to the high side of the vane assists in the slow drop action. It will, of course, be understood that resistance will be developed in the high pressure side by throttling the inlet therefrom to the vane. This pressure is maintained substantially constant by the by-pass valve 65 in the pump casing.

It is to be understood that applicant has shown and described only a preferred embodiment of his improved power lift mechanism and control mechanism therefor, and that he claims as his invention all modifications falling within the scope of the appended claims.

What is claimed is:

1. A power lift device for tractors comprising in combination with a tractor having a transverse transmission shaft forwardly of the rear end comprising a power lift casing mounted ... the rear end of the tractor, a hydraulically actuated piston in said casing, a pump casing mounted at the side of the tractor, said casing enclosing a gear type pump, a drive shaft on which one of said gears is fixed, means for connecting said shaft with the transmission shaft, a conduit member containing two passages connected to the pump casing and to the power lift casing, said passages being in communication with the inlet and outlet of the pump and with the power lift casing.

2. A power lift device for tractors comprising in combination with a tractor having a transverse transmission shaft forwardly of the rear end comprising a power lift casing mounted at the rear end of the tractor, a hydraulically actuated piston in said casing, a pump casing mounted at the side of the tractor, said casing enclosing a gear type pump, a drive shaft on which one of said gears is fixed, said shaft being in alignment with the transmission shaft, means for connecting said shafts whereby the pump is driven from the transmission shaft, a conduit member containing two passages connected to the pump casing and to the power lift casing, said passages being in communication at one end with the inlet and outlet of the pump and at their other ends with the power lift casing, said casing being formed with passages communicating with the piston of the lift, and valve means for supplying fluid under pressure to the piston.

3. In a tractor having a longitudinally extending transmission and differential housing with a transverse transmission shaft at the forward end thereof and in combination therewith a hydraulic power lift casing mounted at the rear of said housing, a lifting shaft extending transversely through the casing, hydraulically actuated means within the casing for oscillating said shaft, a valve mechanism for controlling the flow of fluid to the operating means, a pump casing secured to the housing at the forward end thereof adjacent one end of the transverse transmission shaft, drive connections between said pump and said shaft, and a conduit member secured to the pump housing and to the power lift casing, said member containing a conduit for the fluid under pressure and a return conduit.

4. In a tractor having a longitudinally extending transmission and differential housing with a transverse transmission shaft at the forward end thereof and in combination therewith, a hydraulic power lift casing mounted at the rear of said housing, a lifting shaft extending transversely through the casing, a two-way hydraulically actuated piston within the casing operable to move said shaft in either angular direction, a valve mechanism for controlling the flow of fluid to the operating means, a pump casing secured to the housing at the forward end thereof adjacent one end of the transverse transmission shaft, drive connections between said pump and said shaft, and a conduit member secured to the pump housing and to the power lift casing, said member containing a conduit for the fluid under pressure and a return conduit.

5. In a power lift as set forth in claim 4, a valve construction consisting of a base containing four bores spaced at substantially 90 degrees with respect to each other, said bores communicating with the fluid pressure conduit, the fluid return conduit and with the two sides of the hydraulic piston, a valve member rotatably mounted on said base, said valve member containing two diametrically located recesses adapted to bridge and form communicating means between adjacent pairs of bores in the base, an operating member for rotating the valve member to different angular positions, and an optionally engageable stop for holding the valve member in a staggered position with respect to the bores whereby a reduced rate of movement of the hydraulic piston is obtainable.

6. A power lift device for tractors comprising in combination with a tractor having a transverse transmission shaft forwardly of the rear end comprising a power lift casing mounted at the rear end of the tractor, a lifting shaft extending into said casing, a hydraulically actuated two-way piston in said casing and connected to said shaft, a hydraulic pump casing mounted at the side of the tractor, said casing enclosing a gear type fluid pump, a drive shaft on which one of said gears is fixed, said shaft being in alignment with the transmission shaft, means for connecting said shafts whereby the pump is driven from the transmission shaft, a conduit member containing two passages connected to the pump casing and to the power lift casing, the passages being in communication with the inlet and outlet of the pump with the power lift casing, said casing being formed with passages communicating with the piston of the lift, and valve means for supplying fluid under pressure to either side of the piston and for simultaneously returning fluid from the other side of the piston.

7. A power lift device for tractors comprising, in combination with a tractor and an implement connected thereto, a transverse rockshaft mounted on the tractor, lifting connections between the rockshaft and the implement, a power lift casing through which said shaft extends, a vane secured to the shaft within the casing, means to apply fluid under pressure to one side of the vane whereby the shaft may be rotated, means for simultaneously draining liquid from the other side of the vane, adjustable valve means operable to regulate the supply of fluid under pressure to either side and the draining of fluid from the other side, and manually adjustable stop means operable to retain the valve means in intermediate positions of adjustment whereby movement of the vane may be retarded.

8. A power lift device for tractors comprising, in combination with a tractor and an implement connected thereto, a transverse rockshaft mounted on the tractor, lifting connections between the rockshaft and the implement, a power lift casing through which said shaft extends, a vane secured to the shaft within the casing, a fluid pressure conduit, a fluid return conduit, conduits for supplying fluid under pressure to the casing at either side of the vane whereby the shaft may be rotated in opposite angular directions and for simultaneously permitting escape of fluid from the other side of the vane, adjustable valve means operable to regulate the supply of fluid under pressure to either side and the escape of fluid from the other side, and manually adjustable stop means operable to retain the valve means in intermediate positions of adjustment whereby movement of the vane may be retarded.

9. A hydraulically operated power lift for tractor connected implements comprising a housing mounted on the tractor, a shaft extending into said housing, means for connecting a lifting member to said shaft outside the housing, a substantially semicylindrical chamber formed in the housing around the shaft, a vane secured to said shaft for angular movement therewith in the chamber, means for supplying fluid under pressure to the semicylindrical chamber at one side of the vane adjacent the bottom of the chamber, whereby the vane may be moved in an angular direction, discharge means for permitting fluid to flow from the other side of the vane, control means for throttling said discharge means to effect slow movement of the vane, manually engageable means operable to effect actuation of said control means, and by-pass means operated by movement of the vane to by-pass fluid when the vane has reached its maximum position.

10. In a power lift as set forth in claim 9, a valve means consisting of a base containing four bores spaced at substantially 90 degrees with respect to each other, said bores communicating with the fluid pressure conduit, the fluid return conduit and with the conduit for supplying fluid to the casing, a valve member rotatably mounted on said base, said valve member containing two diametrically located recesses adapted to bridge and form communicating means between adjacent pairs of bores in the base, an operating member for rotating the valve member to different angular positions, and an optionally engageable stop for holding the valve member in a staggered position with respect to the bores whereby a reduced rate of movement of the hydraulic piston is obtainable.

11. A power lift device for tractors comprising, in combination with a tractor and an implement connected thereto, a rockable member mounted on the tractor, lifting connections between said member and the implement, a lifting shaft mounted on the tractor spaced from the rockshaft, a lifting lever on the rockshaft, a lifting crank on the lifting shaft, a lifting member connecting said crank and said lever, a casing into which the lifting shaft extends, a vane secured to said shaft within the casing, fluid conduits communicating with the casing at each side of the vane, and valve means for supplying fluid under pressure to one of said conduits and for simultaneously draining fluid from the other conduit, said valve means being provided with optionally engageable stop means for holding the valve means in a position effective to throttle the draining conduit.

12. In a power lift as set forth in claim 9, a valve means consisting of a base containing four bores spaced at substantially 90 degrees with respect to each other, said bores communicating with the fluid pressure conduit, the fluid return conduit and with the conduit for supplying fluid to the casing, a valve member rotatably mounted on said base, said valve member containing two diametrically located recesses adapted to bridge and form communicating means between adjacent pairs of bores in the base, an operating member including a rotatable handle for rotating the valve member to different angular positions, and a stop operable by rotation of said handle for holding the valve member in a staggered position with respect to the bores whereby a reduced rate of movement of the hydraulic piston is obtainable.

13. A power lift device for tractors comprising, in combination with a tractor and an implement connected thereto, a rockable member mounted on the tractor, lifting connections between said member and the implement, a lifting shaft mounted on the tractor spaced from the rockshaft, a lifting lever on the rockshaft, a lifting crank on the lifting shaft, a lifting member connecting said crank and said lever, a casing into which the lifting shaft extends, a vane secured to said shaft within the casing, fluid conduits communicating with the casing at each side of the vane, and valve means including a rotatable operating handle for supplying fluid under pressure to one of said conduits and for simultaneously draining fluid from the other conduit, said valve means being provided with optionally engageable stop means carried by the handle and brought into actuating position thereby for holding the valve means in a position effective to throttle the draining conduit.

EDWARD A. JOHNSTON.